(12) United States Patent
Yu

(10) Patent No.: US 12,124,046 B2
(45) Date of Patent: Oct. 22, 2024

(54) APPARATUS AND METHODOLOGY FOR RESHAPING A LASER BEAM

(71) Applicant: Boston Scientific Scimed, Inc., Maple Grove, MN (US)

(72) Inventor: Honggang Yu, San Jose, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 18/377,012

(22) Filed: Oct. 5, 2023

(65) Prior Publication Data

US 2024/0027781 A1    Jan. 25, 2024

Related U.S. Application Data

(63) Continuation of application No. 17/446,025, filed on Aug. 26, 2021, now Pat. No. 11,815,697, which is a
(Continued)

(51) Int. Cl.
*G02B 27/09* (2006.01)
*G02B 6/42* (2006.01)
(Continued)

(52) U.S. Cl.
CPC ....... *G02B 27/0955* (2013.01); *G02B 6/4206* (2013.01); *G02B 27/0012* (2013.01);
(Continued)

(58) Field of Classification Search
CPC ............ G02B 27/0955; G02B 27/0012; G02B 27/106; G02B 27/14; G02B 27/0977;
(Continued)

(56) References Cited

U.S. PATENT DOCUMENTS 4,435,733 A    3/1984  Tagawa et al.
4,810,069 A    3/1989  Kobayashi
(Continued)

FOREIGN PATENT DOCUMENTS

CN    103260811 A    8/2013
CN    107078466 A    8/2017
(Continued)

OTHER PUBLICATIONS

First Office Action issued in CN 201880072908.X dated Jul. 25, 2022 (9 Pages).

*Primary Examiner* — Ryan A Lepisto
*Assistant Examiner* — Erin D Chiem
(74) *Attorney, Agent, or Firm* — Seager, Tufte & Wickhem, LLP

(57) ABSTRACT

A laser system may include a laser resonator configured to emit an input laser beam having an elliptical cross-sectional shape. The laser system also may include first reflective device configured to reflect the input laser beam to produce a first reflected laser beam. The first reflective device may include a spherical surface for reflecting the input laser beam. The laser system also may include a second reflective device configured to reflect the first reflected laser beam to produce a second reflected laser beam. The laser system also may include a coupling device configured to focus the second reflected laser beam to produce an output laser beam. The coupling device may include a spherical surface for receiving the second reflected laser beam. The laser system also may include an optic fiber configured to transmit the output laser beam for emission of the output laser beam onto a target area.

20 Claims, 10 Drawing Sheets

Related U.S. Application Data continuation of application No. 16/185,659, filed on Nov. 9, 2018, now Pat. No. 11,131,859.

(60) Provisional application No. 62/584,478, filed on Nov. 10, 2017.

(51) Int. Cl.
| | | |
|---|---|---|
| *G02B 19/00* | (2006.01) | |
| *G02B 27/00* | (2006.01) | |
| *G02B 27/10* | (2006.01) | |
| *G02B 27/14* | (2006.01) | |
| *H01S 3/00* | (2006.01) | |
| *H01S 3/092* | (2006.01) | |
| *H01S 3/16* | (2006.01) | |
| *H01S 3/23* | (2006.01) | |

(52) U.S. Cl.
CPC ............ *G02B 27/106* (2013.01); *G02B 27/14* (2013.01); *H01S 3/005* (2013.01); *H01S 3/0071* (2013.01); *G02B 27/0977* (2013.01); *H01S 3/092* (2013.01)

(58) Field of Classification Search
CPC ............ G02B 27/0983; G02B 27/0911; G02B 6/4206; H01S 3/005; H01S 3/0071; H01S 3/092; H01S 3/161; H01S 3/1616; H01S 3/1623; H01S 3/1643; H01S 3/2383
See application file for complete search history.

(56) References Cited

U.S. PATENT DOCUMENTS

| | | |
|---|---|---|
| 5,144,630 A | 9/1992 | Lin |
| 5,206,736 A | 4/1993 | Simpson |
| 5,206,763 A | 4/1993 | Macken et al. |
| 5,212,710 A | 5/1993 | Kaneda et al. |
| 5,237,451 A | 8/1993 | Saxe |
| 5,251,060 A | 10/1993 | Uenishi et al. |
| 5,315,614 A | 5/1994 | Grace et al. |
| 5,883,658 A | 3/1999 | Schubert et al. |
| 5,900,963 A | 5/1999 | Li et al. |
| 5,925,271 A | 7/1999 | Pollack et al. |
| 6,014,361 A | 1/2000 | Nagashima et al. |
| 6,768,593 B1 | 7/2004 | Jutamulia |
| 2006/0203859 A1 | 9/2006 | Cable et al. |
| 2009/0257118 A1 | 10/2009 | Heritier et al. |
| 2013/0077917 A1 | 3/2013 | Lassalas et al. |
| 2015/0277056 A1 | 10/2015 | Colbourne |
| 2018/0015502 A1* | 1/2018 | Zenou ................. G02B 6/3598 |

FOREIGN PATENT DOCUMENTS

| | | |
|---|---|---|
| CN | 107112707 A | 8/2017 |
| DE | 3228221 A1 | 4/1983 |
| EP | 0468319 A1 | 1/1992 |
| EP | 0468319 B1 | 1/1992 |
| GB | 0505794 | 4/2005 |
| KR | 1020060014003 A | 2/2006 |
| WO | 8600720 A1 | 1/1986 |
| WO | 2007107684 A1 | 9/2007 |

* cited by examiner

138

$$\omega_x = \frac{f_1 f_2}{\sqrt{[(f_1-d_1)^2+Z_{Rx}^2]\cdot[(f_2-S_{2x})^2+m_{1x}^4\cdot Z_{Rx}^2]}} = 280um \quad (1)$$

$$\omega_y = \frac{f_1 f_2}{\sqrt{[(f_1-d_1)^2+Z_{Ry}^2]\cdot[(f_2-S_{2y})^2+m_{1y}^4\cdot Z_{Ry}^2]}} = 280um \quad (2)$$

$$m_{1x} = \frac{f_1}{\sqrt{[(f_1-d_1)^2+Z_{Rx}^2]}} \quad (3)$$

$$m_{1y} = \frac{f_1}{\sqrt{[(f_1-d_1)^2+Z_{Ry}^2]}} \quad (4)$$

$$S_{2x} = d_2 + d_3 - \frac{[d_1\cdot(d_1-f_1)+Z_{Rx}^2]\cdot f_1}{(d_1-f_1)^2+Z_{Rx}^2} \quad (5)$$

$$S_{2y} = d_2 + d_3 - \frac{[d_1\cdot(d_1-f_1)+Z_{Ry}^2]\cdot f_1}{(d_1-f_1)^2+Z_{Ry}^2} \quad (6)$$

FIG. 2

| OPTION 4-VSS3.0-GAUSSIAN OPTICS | BEAM WAIST BEFORE LENS (mm, DIA.) | BEAM DIVERGENT ANGLE (RAD, FULL) | RAYLEIGH RANGE (mm) | BEAM WAIST POSITION RELATIVE TO LENS (mm) | FOCAL LENGTH (mm) | FACTOR= ZR^2/(s−f) | 1/(S+FACTOR) | 1/f | BEAM WAIST POSITION AFTER LENS (mm) | [1−(s/f)]^2 | (ZR/f)^2 | MAG. | BEAM WAIST SIZE AFTER LENS (mm, DIA) | BEAM DIVERGENT ANGLE AFTER LENS (RAD, FULL) |
|---|---|---|---|---|---|---|---|---|---|---|---|---|---|---|
| RELAY MIRROR (Y) | 3.70 | 0.0201 | 184.05 | 126.00 | 140 | −2419 | −0.0004 | 0.0071 | 131.95 | 0.01 | 1.73 | 0.76 | 2.81 | 0.0265 |
| COUPLING LENS | 2.81 | 0.0265 | 105.88 | 202.05 | 19 | 61 | 0.0038 | 0.0526 | 20.46 | 92.82 | 31.06 | 0.09 | 0.25 | 0.2952 |
| RELAY MIRROR (X) | 3.29 | 0.0205 | 160.70 | 125.00 | 140 | −1845 | −0.0006 | 0.0071 | 129.45 | 0.01 | 1.32 | 0.87 | 2.86 | 0.0236 |
| COUPLING LENS | 2.86 | 0.0236 | 121.05 | 204.55 | 19 | 79 | 0.0035 | 0.0526 | 20.36 | 95.37 | 40.59 | 0.09 | 0.25 | 0.2753 |

| OPTION 4-VSS3.0-GAUSSIAN OPTICS | BEAM WAIST BEFORE LENS (mm, DIA.) | BEAM DIVERGENT ANGLE (RAD, FULL) | RAYLEIGH RANGE (mm) | BEAM WAIST POSITION RELATIVE TO LENS (mm) | FOCAL LENGTH (mm) | FACTOR= ZR^2/(s-f) | 1/(S+FACTOR) | 1/f | BEAM WAIST POSITION AFTER LENS (mm) | [1-(s/f)]^2 | (ZR/f)^2 | MAG. | BEAM WAIST SIZE AFTER LENS (mm, DIA.) | BEAM DIVERGENT ANGLE AFTER LENS (RAD, FULL) |
|---|---|---|---|---|---|---|---|---|---|---|---|---|---|---|
| RELAY MIRROR (Y) | 3.70 | 0.0201 | 184.05 | 133.30 | 175 | -812 | -0.0015 | 0.0057 | 139.14 | 0.06 | 1.11 | 0.93 | 3.43 | 0.0217 |
| COUPLING LENS | 3.43 | 0.0217 | 158.27 | 493.86 | 29.7 | 55 | 0.0019 | 0.0337 | 31.43 | 233.83 | 28.40 | 0.06 | 0.21 | 0.3513 |
| RELAY MIRROR (X) | 3.29 | 0.0205 | 160.70 | 133.30 | 175 | -619 | -0.0021 | 0.0057 | 128.67 | 0.06 | 0.84 | 1.05 | 3.47 | 0.0194 |
| COUPLING LENS | 3.47 | 0.0194 | 178.55 | 494.33 | 29.7 | 69 | 0.0018 | 0.0337 | 31.35 | 244.74 | 36.14 | 0.06 | 0.21 | 0.3258 |

| OPTION 4-VSS3.0-GAUSSIAN OPTICS | BEAM WAIST BEFORE LENS (mm, DIA.) | BEAM DIVERGENT ANGLE (RAD, FULL) | RAYLEIGH RANGE (mm) | BEAM WAIST POSITION RELATIVE TO LENS (mm) | FOCAL LENGTH (mm) | FACTOR= ZR^2/(s-f) | 1/(S+FACTOR) | 1/f | BEAM WAIST POSITION AFTER LENS (mm) | [1-(s/f)]^2 | (ZR/f)^2 | MAG. | BEAM WAIST SIZE AFTER LENS (mm, DIA.) | BEAM DIVERGENT ANGLE AFTER LENS (RAD, FULL) |
|---|---|---|---|---|---|---|---|---|---|---|---|---|---|---|
| RELAY MIRROR (Y) | 3.70 | 0.0201 | 184.05 | 218.35 | 185 | 1016 | 0.0008 | 0.0054 | 217.53 | 0.03 | 0.99 | 0.99 | 3.66 | 0.0203 |
| COUPLING LENS | 3.66 | 0.0203 | 180.05 | 320.37 | 21.78 | 109 | 0.0023 | 0.0459 | 22.95 | 187.95 | 68.34 | 0.06 | 0.23 | 0.3256 |
| RELAY MIRROR (X) | 3.29 | 0.0206 | 160.70 | 218.35 | 185 | 774 | 0.0010 | 0.0054 | 227.37 | 0.03 | 0.75 | 1.13 | 3.71 | 0.0182 |
| COUPLING LENS | 3.71 | 0.0182 | 204.18 | 310.63 | 21.78 | 144 | 0.0022 | 0.0459 | 22.88 | 175.88 | 87.89 | 0.06 | 0.23 | 0.2953 |

APPARATUS AND METHODOLOGY FOR RESHAPING A LASER BEAM

CROSS-REFERENCE TO RELATED APPLICATIONS

This patent application is a continuation under 37 CFR § 1.53(b) of U.S. application Ser. No. 17/446,025, filed on Aug. 26, 2021, which is a continuation of U.S. application Ser. No. 16/185,659, filed on Nov. 9, 2018, which claims the benefit of priority under 35 U.S.C. § 119 to U.S. Provisional Application No. 62/584,478, filed Nov. 10, 2017, each of which is herein incorporated by reference in its entirety.

TECHNICAL FIELD

Various aspects of the present disclosure generally relate to an apparatus and methodology for determining laser system parameters, and more particularly, to an apparatus and methodology for determining laser system parameters for enhancing an alignment tolerance between a laser beam and a laser fiber in a laser system.

BACKGROUND

A laser system may be used in a lithotripsy procedure. The laser system may emit a laser beam for breaking stones or other calculi in a subject's kidney, bladder, or other ureteral organs, into smaller particles that may be easier to remove from a subject's body. The laser system may include a laser resonator, the laser resonator including a gain medium between a pair of mirrors. The gain medium, when supplied with energy in a process called pumping, may amplify light to increase its power, resulting in the emission of the laser beam from the laser resonator. A flash lamp may pump the gain medium by supplying energy into the gain medium from a lateral side of the gain medium. Side pumping may result in emission of a laser beam that has an elliptical cross-section from the laser resonator, rather than a circular cross-section. When the laser beam propagates to an optical fiber for emission from the laser system, the laser beam may still have an elliptical cross-section. The optical fiber, however, may have a circular cross-section defined by a fiber core surrounded by cladding. As a result, an alignment tolerance of the laser beam as it propagates to the optical fiber may be tighter along a first axis than along a second axis transverse to the first axis. As such, at least a portion of the energy of the laser beam may be absorbed by the cladding, possibly resulting in damage. The alignment tolerance may be improved by reshaping the laser beam to have a more circular cross-section before the laser beam reaches the optical fiber. A conventional method for reshaping a laser beam involves using a cylindrical lens to reduce a dimension of a cross-section of the laser beam. The addition of a cylindrical lens to the laser system may increase costs associated with manufacturing the laser system, increase transmission loss within the laser system, and/or detract from the reliability of the laser system. By reshaping the laser beam without adding the cylindrical lens, the alignment tolerance may be improved, while the aforementioned drawbacks may be avoided.

SUMMARY

Aspects of the present disclosure relate to, among other things, an apparatus and methodology for determining laser system parameters, and more particularly, to an apparatus and methodology for determining laser system parameters for enhancing alignment tolerances.

According to an aspect of the present disclosure, a laser system may include a laser resonator configured to emit an input laser beam having an elliptical cross-sectional shape. The laser system also may include first reflective device configured to reflect the input laser beam to produce a first reflected laser beam. The first reflective device may include a spherical surface for reflecting the input laser beam. The laser system also may include a second reflective device configured to reflect the first reflected laser beam to produce a second reflected laser beam. The laser system also may include a coupling device configured to focus the second reflected laser beam to produce an output laser beam. The coupling device may include a spherical surface for receiving the second reflected laser beam. The output laser beam may have a circular cross-sectional shape. The laser system also may include an optic fiber configured to transmit the output laser beam for emission of the output laser beam onto a target area.

According to another aspect of the present disclosure, the laser system may include one or more of the following features. The laser system may not include a cylindrical lens. The spherical surface of the first reflective device may be concave. The spherical surface of the coupling device may be convex. The circular cross-sectional shape may have dimensions with a ratio of approximately 1:1, the dimensions being measured along transverse axes. The elliptical cross-sectional shape may have a dimension along a first axis that is greater than a dimension along a second axis, the first axis being transverse to the second axis. The first reflective device may include a mirror. The second reflective device may include a galvo mirror. The coupling device may include a lens.

According to an aspect of the present disclosure, a method for reshaping a laser beam may include emitting an input laser beam from a laser resonator. A ratio of dimensions of a cross-section of the input laser beam along transverse axes may have a first value. The method also may include reflecting the input laser beam off of a spherical surface of a first reflective device to produce a first reflected laser beam. The method also may include reflecting the first reflected laser beam off of a second reflective device to produce a second reflected laser beam. The method also may include focusing the second reflected laser beam into an output laser beam by directing the second reflected laser beam at a spherical surface of a coupling device and through the coupling device. A ratio of dimensions of a cross-section of the output laser beam along the transverse axes may have a second value different from the first value.

According to another aspect of the present disclosure, the method may include one or more of the following features. There may not be any cylindrical lens downstream from the coupling device. The second value may be approximately 1. The spherical surface of the first reflective device may be concave. The spherical surface of the coupling device may be convex. Focusing the second reflected laser beam may include directing the second reflected laser beam through a planar surface of the coupling device.

According to an aspect of the present disclosure, a method for configuring a laser system may include entering one or more parameters of the laser system in a simulation program. The method also may include predicting dimensional values of a cross-section of a laser beam of the laser system with the simulation program. The method also may include adjusting the one or more parameters in the simulation program until the predicted dimensional values are indicative of the cross-section being circular. The method also may include implementing the one or more parameters in the laser system.

According to another aspect of the present disclosure, the method may include one or more of the following features. Implementing the one or more parameters may include implementing the adjusted one or more parameters. The simulation program may be a theoretical simulation program. The method also may include entering the adjusted one or more parameters in a numerical simulation program, and modifying the adjusted one or more parameters to adapt the adjusted one or more parameters to a real-world environment. Implementing the one or more parameters may include implementing the modified one or more parameters in the laser system. The one or more parameters of the laser system may include a focal length of a mirror in the laser system and a focal length of a coupling lens in the laser system.

It should be understood that both the foregoing general description and the following detailed description are exemplary and explanatory only and are not restrictive of the features claimed. Additional objects and advantages of the disclosed aspects will be set forth in part in the description that follows, and in part will be apparent from the description, or may be learned by practice of the disclosed aspects. The objects and advantages of the disclosed aspects will be realized and attained by means of the elements and combinations particularly pointed out in the appended claims.

BRIEF DESCRIPTION OF THE DRAWINGS

The accompanying drawings, which are incorporated in and constitute a part of this specification, illustrate aspects of the present disclosure and together with the description, serve to explain the principles of the disclosure.

The accompanying drawings, which are incorporated in and constitute a part of this specification, illustrate exemplary aspects of the present disclosure and together with the description, serve to explain the principles of the disclosure.

FIG. 2 is a listing of Gaussian beam propagation equations, in accordance with aspects of the present disclosure.

FIG. 3A is a table showing input and output values of a theoretical simulation program, related to a portion of the laser system of FIG. 1A, in accordance with aspects of the present disclosure.

FIG. 6 is a table showing input and output values of a theoretical simulation program, related to the portion of the laser system of FIG. 5A, in accordance with aspects of the present disclosure.

FIG. 7 is another table showing input and output values of a theoretical simulation program, related to the portion of the laser system of FIG. 5A, in accordance with aspects of the present disclosure.

DETAILED DESCRIPTION

Reference will now be made in detail to the exemplary aspects of the disclosure, examples of which are illustrated in the accompanying drawings. Wherever possible, the same reference numbers will be used throughout the drawings to refer to the same or like parts.

As used herein, the terms "comprises," "comprising," or any other variation thereof, are intended to cover a non-exclusive inclusion such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal."

Moreover, numerous axes and directions are described in the present disclosure. The axes may form a Cartesian coordinate system with an origin point and x-, y-, and z-axes extending outwardly therefrom. Directions and relativity may be indicated by the terms "proximal" and "distal." "Proximal" refers to a position closer to the exterior of a subject's body or to a user of the laser system, whereas "distal" refers to a position closer to the interior of the subject's body or further from the user of the laser system. Directions and relativity may also be indicated by the terms "upstream" and "downstream." "Upstream" refers to a position closer to where a laser beam originates, while "downstream" refers to a position farther from where the laser beam originates. Unless claimed, these terms are provided for convenience and not intended to limit the present disclosure to a particular location, direction, or orientation. Unless stated otherwise, terms such as "generally," "about," "substantially," and/or "approximately" indicate a range of possible values that are within +/−5% of a stated value or condition.

Figure 1A:
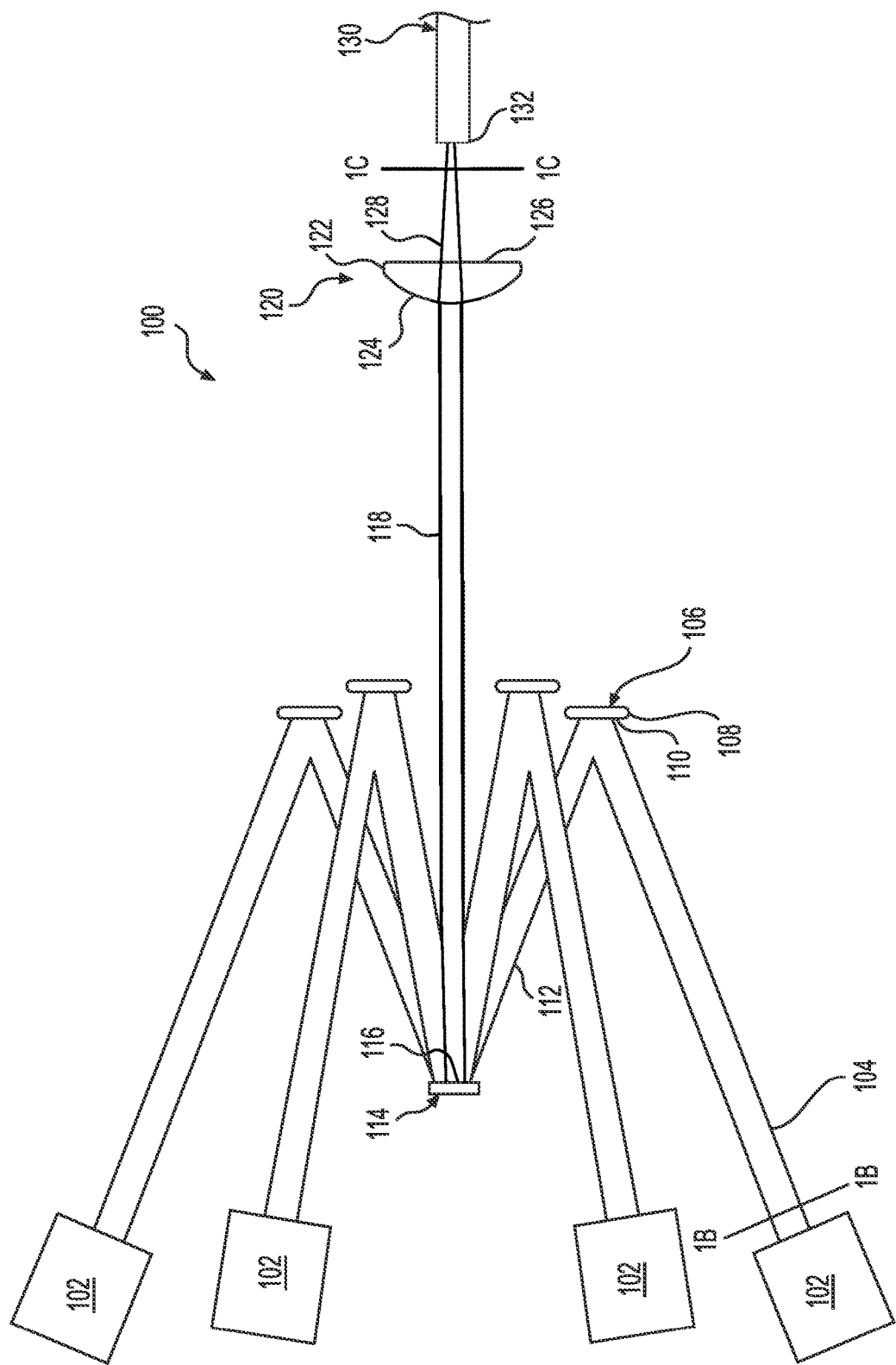
FIG. 1A is a schematic illustration of a laser system, in accordance with aspects of the present disclosure.

FIG. 1A shows a schematic illustration of a laser system 100. Laser system 100 may include a laser resonator 102. In one example, laser resonator 102 may include a gain medium (not shown) between a pair of mirrors (not shown). The gain medium, when supplied with energy by a source, such as a flash lamp pumping the gain medium from a lateral side of the gain medium, may amplify light being reflected between the pair of mirrors and through the gain medium to increase in power, resulting in the emission of an input laser beam 104 from laser resonator 102 toward a relay device 106.

In one exemplary embodiment, laser resonator 102 may utilize a Chromium-Thulium-Holmium-doped YAG crystal ("CTH:YAG") as the gain medium. The emitted input laser beam 104 may be pulsed, with an energy of up to about 2 Joules per pulse, a frequency up to about 100 Hz, and a wavelength of about 2.1 micrometers. Such parameters may be useful for lithotripsy procedures. Other parameters also are contemplated, for use in both medical and non-medical contexts.

Laser resonator 102 may be movably mounted. For example, laser resonator 102 may be configured to move relative to relay device 106 to facilitate precise alignment of input laser beam 104 with relay device 106. In one example, moving the laser resonator 102 may include tilting laser resonator 102. During tilting, laser resonator 102 may rotate about an axis (not shown) transverse to an emission direction of input laser beam 104. Additionally or alternatively, laser resonator 102 may rotate about an axis (not shown) parallel to the emission direction of input laser beam 104. The tilting may be facilitated by mounting laser resonator 102 on a tilting stage or mount (not shown).

Relay device 106 of laser system 100 may receive input laser beam 104 from laser resonator 102. Relay device 106 may include a spherical lens or mirror 108 having a reflective surface 110. Reflective surface 110 may receive input laser beam 104, and may redirect input laser beam 104 by reflecting input laser beam 104, resulting in transmission of a first redirected laser beam 112 from relay device 106 towards a galvo mirror 114 of laser system 100. Reflective surface 110 may, for example, be curved and concave, such that reflective surface 110 may focus or otherwise reduce a beam size of input laser beam 104, resulting in the more concentrated first redirected laser beam 112 being directed toward galvo mirror 114.

Relay device 106 also may be movably mounted. For example, relay device 106 may be movably mounted so as to tilt in one or more directions. In one example, relay device 106 may rotate (e.g., tilt) about an axis (not shown) parallel to an emission direction of first redirected laser beam 112. Additionally or alternatively, relay device 106 may rotate (e.g., tilt) about an axis (not shown) transverse to the emission direction of first redirected laser beam 112. The rotation/tilting may be facilitated by mounting relay device 106 on a tilting stage or mount (not shown). The rotation/tilting of relay device 106 and laser resonator 102 may provide a user with control over four degrees of freedom for aiming first redirected laser beam 112 at galvo mirror 114.

Galva mirror 114 may have a reflective surface 116 that may receive first redirected laser beam 112, and further redirect first redirected laser beam 112 by reflecting first redirected laser beam 112, resulting in transmission of a second redirected laser beam 118 from galvo mirror 114 towards a coupling device 120 of laser system 100. In one example, reflective surface 116 may be planar.

As depicted in FIG. 1A, laser system 100 may include a plurality of laser resonators, each of which may be similar to laser resonator 102. Four are shown, but it should be understood that the use of fewer resonators in laser system 100, or more resonators, also is contemplated. Each of the laser resonators may emit an input laser beam, similar to input laser beam 104, towards its own corresponding relay device, each of which may be similar to relay device 106. The relay devices may transmit a plurality of first redirected laser beams, each being similar to first redirected laser beam 112, to galvo mirror 114. Galva mirror 114 may combine the first redirected laser beams to form second redirected laser beam 118. It is contemplated that the laser resonators, input laser beams, relay devices, and first redirected laser beams, may be identical in some examples, and in other examples, one or more of each may be different.

Coupling device 120 may include a spherical lens 122 having a proximal, substantially convex surface 124 and a distal, substantially planar surface 126. Second redirected laser beam 118 may be received by convex surface 124, may pass through the material of coupling device 120, and may be emitted from planar surface 126 as an output laser beam 128. Output laser beam 128 may be received by an optic fiber 130.

Optic fiber 130 may include a central fiber core (not shown) surrounded by cladding (not shown). Output laser beam 128 may be received by the fiber core at a proximal end 132 of optic fiber 130. Any suitable coupler (not shown) may be at proximal end 132 to facilitate introduction of output laser beam 128 into optic fiber 130. For example, a ferrule, or a similar coupler may couple optic fiber 130 to a housing or enclosure (not shown) encompassing the rest of laser system 100. Output laser beam 128 may be transmitted through the fiber core by total internal reflection therein, and may be emitted from a distal end (not shown) of optic fiber 130 onto a target area. The fiber core may have a diameter ranging from about 240 micrometers to 910 micrometers, and/or a numerical aperture ranging from about 0.22 to 0.28.

Figure 1C:
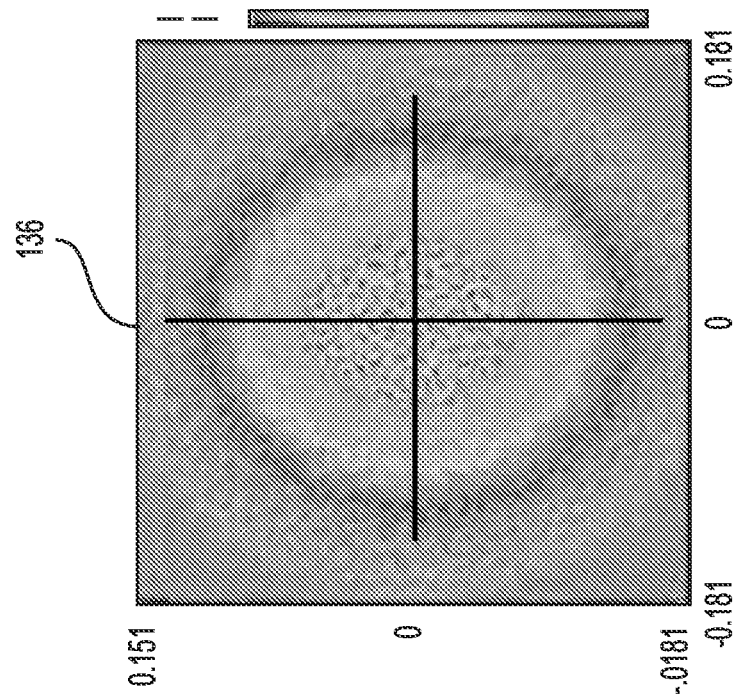
FIG. 1C is a view of a cross-section of a laser beam taken at another point within the laser system of FIG. 1A, in accordance with aspects of the present disclosure. [0017]
Figure 1B:
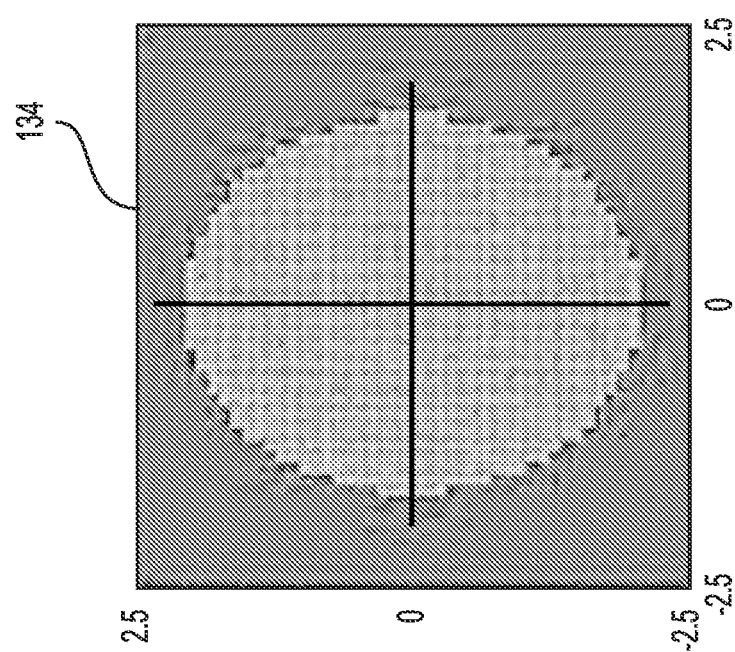
FIG. 1B is a view of a cross-section of a laser beam taken at a point within the laser system of FIG. 1A, in accordance with aspects of the present disclosure.

In some configurations of laser system 100, input laser beam 104 may have an elliptical cross-section. FIG. 1B shows an example of how a cross-section 134 of input laser beam 104, taken along line 1B-1B in FIG. 1A, may look. Cross-section 134 may be elliptical, having its longer, major axis extending along the y-axis direction, and its shorter, minor axis extending along the x-axis direction. FIG. 1C shows an example of how a cross-section 136 of output laser beam 128, taken along line 1C-1C in FIG. 1A, may look. Cross-section 136 may be similar to cross-section 134 in that it has a similar elliptical shape. The elliptical shape of cross-section 136 may negatively impact the alignment tolerance between second redirected laser beam 118 and proximal end 132 of optical fiber 130, resulting in reduced performance and/or reliability Reshaping second redirected laser beam 118, by making it less elliptical and more circular, may improve the alignment tolerance. According to one aspect of the present disclosure, second redirected laser beam 118 may be reshaped by adjusting one or more parameters of relay device 106 and/or coupling device 120, without adding additional components to laser system 100. For example, second redirected laser beam 118 may be reshaped without adding a cylindrical lens for reshaping second redirected laser beam 118.

An exemplary methodology for reshaping second redirected laser beam 118 may be based on the laser beam(s) in laser system 100 being, or at least closely resembling, Gaussian beams. A Gaussian beam may behave in accordance with the Gaussian beam propagation equations 138 shown in FIG. 2. In equations 138, f1 and f2 are focal lengths of relay device 106 and coupling device 120, respectively; d1, d2, and d3 are distances between laser resonator 102 and relay device 106, between relay device 106, and galvo mirror 114, and between galvo mirror 114 and coupling device 120, respectively; $ZRx=wx!Sx$ and $ZRy=wy!Sy$ are the Raleigh ranges of the laser beam in the x-direction (horizontal) and y-direction (vertical), respectively (where Wx and Wy are the beam waist radii of the laser beam in the x- and y-directions, respectively; and Sx and Sy are one-half the beam divergent angles of the laser beam in the x- and y-directions, respectively); m1x and m1y are the magnifications of the laser beam in x- and y-directions, respectively, distal to relay device 106; and S2x and S2y are object distances before coupling device 120 (and/or image distances after galvo mirror 114) in x- and y-directions, respectively. In addition, the shape of a Gaussian beam may have a beam waist at a point of its focus, where the width of the Gaussian beam is the smallest, and the Gaussian beam is most intense.

Figure 3B:
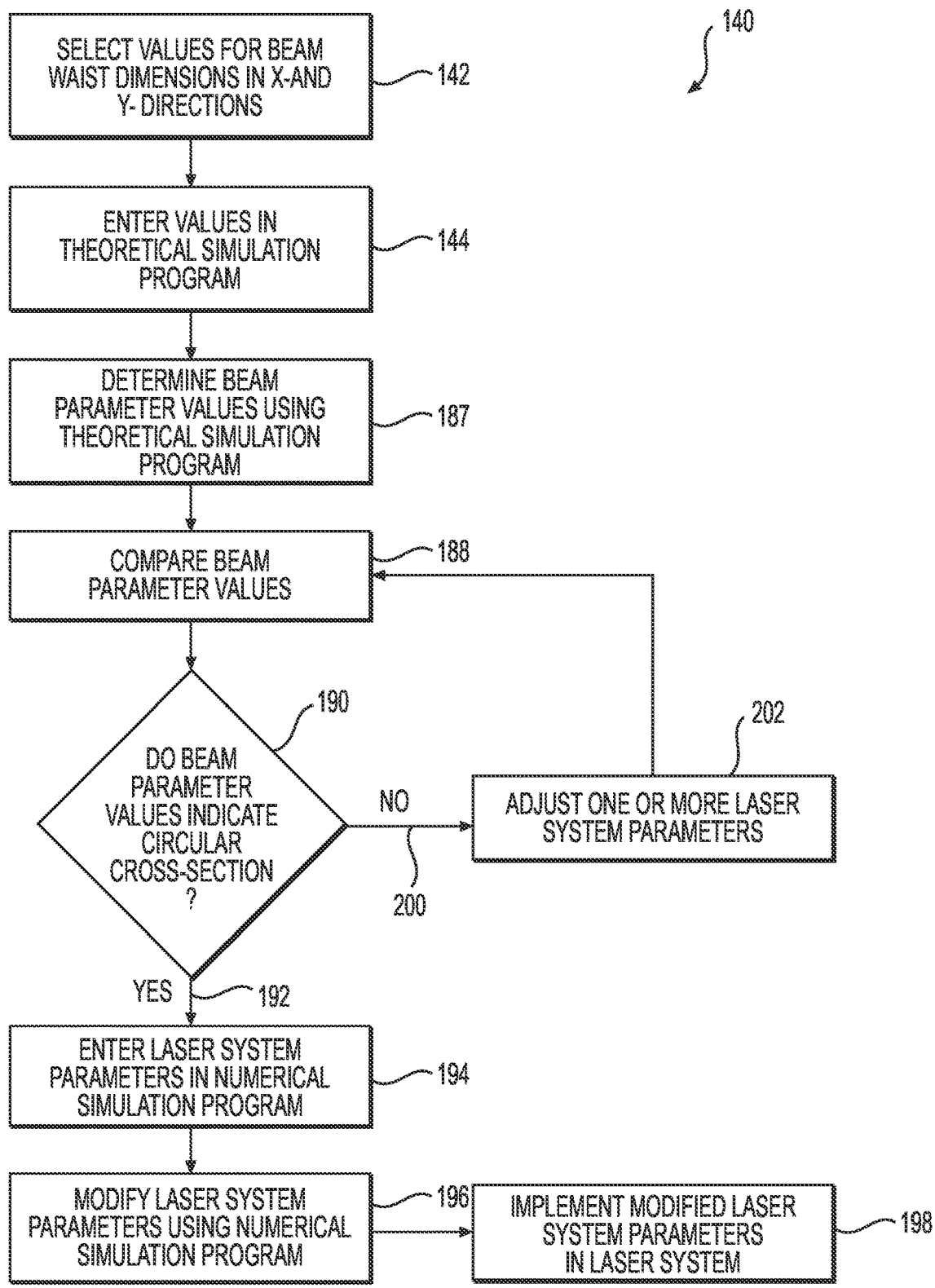
FIG. 3B is a flow diagram of a method for reshaping a laser beam that relates to the table of FIG. 3A, in accordance with aspects of the present disclosure.

FIG. 3B shows an exemplary method 140 for reshaping second redirected laser beam 118. Method 140 may begin (step 142) with the user selecting values for Wx, Wy, and/or any other parameter values. The selected values Wx and Wy may be substantially equal because their equality is indicative of a laser beam cross-section having a circular shape, rather than an elliptical shape, which may have a closer alignment tolerance with the fiber core of optical fiber 130. As shown in FIG. 2, Wx and Wy each may be 280 micrometers. The values may be selected to fit the dimensions of the fiber core of optic fiber 130.

These known, and any known and/or fixed values associated with laser system 100, may be entered into a computer-based theoretical simulation program (step 144). The theoretical simulation program may, at least theoretically, determine how laser system 100 may perform when assigned a particular set of parameters. A table 146, shown in FIG. 3A, is a visual representation of the theoretical simulation program, in that table 146 may display known and determined values that may be used in or determined by algorithms in the theoretical simulation program. Additionally or alternatively, table 146 may be formulated in a Microsoft Excel spreadsheet, with the theoretical simulation program communicating with the spreadsheet, and/or with the functionality of the theoretical simulation program embodied in the spreadsheet in the form of one or more formulas programmed into the spreadsheet.

Table 146 may include a plurality of rows 148. Four rows 150, 152, 154, and 156 are shown, but it should be understood that having more rows in table 146, or fewer rows, is contemplated. In this example, first row 150 may be for values associated with relay device 106, with the values being those along the y-direction.

Second row 152 may be for values associated with coupling device 120, with the values being those in the y-direction. Third row 154 may be for values associated with relay device 106, with the values being those along the x-direction. Fourth row 156 may be for values associated with coupling device 120, with the values being those along the x-direction.

Table 146 also may include a plurality of columns 158 for a plurality of values. Fourteen columns 160, 162, 164, 166, 168, 170, 172, 174, 176, 178, 180, 182, 184, 186, 188, 190, 192, 194, 196, 198, 200, and 202 are shown, but it should be understood that having more columns, or fewer columns, also is contemplated. Using first row 150 of table 146 as an example, first column 160 may include a beam waist value in they-direction for a laser beam (e.g., input laser beam 104) upstream from relay device 106; second column 162 may include a beam divergent angle value in the y-direction for the laser beam upstream from relay device 106; third column 164 may include a Rayleigh range value in the y-direction for the laser beam upstream from relay device 106; fourth column 166 may include a beam waist position value, as measured in the y-direction between: (A) a beam waist of the laser beam upstream from relay device 106, and (B) relay device 106; fifth column 168 may include a focal length value for relay device 106; sixth, seventh, and eighth columns 170, 172, and 174 may include factors applicable to relay device 106, with values for the factors being determined based on known and/or previously-determined values for laser system 100 and equations 138, in relation to they-direction; ninth column 176 may include a beam waist position value, in the y-direction, as measured between: (A) a beam waist of a laser beam (e.g., first redirected laser beam 112) downstream from relay device 106, and (B) relay device 106; tenth and eleventh columns 178 and 180 may include factors applicable to relay device 106, with values for the factors being determined based on known and/or previously determined values for laser system 100 and equations 138 in relation to they-direction; twelfth column 182 may include a magnification value in the y-direction for the laser beam downstream from relay device 106; thirteenth column 184 may include a beam waist size value, in the y-direction, for the laser beam downstream from relay device 106; and fourteenth column 186 may include a beam divergent angle value in the y-direction of the laser beam downstream from relay device 106. Second row 152 of table 146 may include analogous values associated with, and described relative to, coupling device 120, and pertaining to the y-direction; third row 154 of table 146 may include analogous values associated with, and described relative to, relay device 106, but pertaining to the x-direction rather than the y-direction; and fourth row 156 of table 146 may include analogous values associated with, and described relative to, coupling device 120, and pertaining to the x-direction rather than the y-direction.

Entry of one or more values into the theoretical simulation program (e.g., in one or more cells of table 146) may result in automatic population of entries in one or more other memory locations (e.g., cells of table 146), based on one or more algorithms and/or equations, such as equations 138. For example, entering values in one or more cells of first row 150 of table 146 may result in the generation of values in thirteenth and fourteenth columns 184 and 186. Those values may be associated with the laser beam downstream from relay device 106, which is the laser beam that is upstream from coupling device 120. As such, those values are entered into first and second columns 160 and 162 of second row 152, for use in populating other cells in second row 152. Similarly, the values in thirteenth and fourteenth columns 184 and 186 of third row 154 are entered into first and second columns 160 and 162 of fourth row 156. It should be understood that values for first row 150 are determined before values for second row 152 can be determined, and values for third row 154 are determined before values for fourth row 156 can be determined. Values for first row 150 and third row 154 may be determined simultaneously, or one after the other (i.e., first then third, or vice-versa).

Method 140 may include determining one or more values with the theoretical simulation program (step 187), including the beam waist size values, and comparing the beam waist size values (step 188) in the x- and y-directions, from thirteenth column 184 of second and fourth rows 152 and 156, to determine if they are the same, or sufficiently similar (e.g., within a predetermined range) (step 190), so as to indicate a substantially circular beam waist. These steps may be automatically performed by the theoretical simulation program and/or by the user. The beam waist is that of output laser beam 128, which is downstream of coupling device 120. Thus, the cross-sectional shape of the beam waist is indicative of the cross-sectional shape of output beam 128.

The more circular the cross-sectional shape of output laser beam 128, the better the alignment tolerance between output laser beam 128 and the fiber core of optical fiber 130.

If the beam waist sizes in the x- and y-directions are indicative of a circular cross-sectional shape (YES 192), the determined parameters of relay device 106 and/or coupling device 120 that produced that result in the theoretical simulation program may be entered into a computer-based numerical simulation program (step 194). The determined parameters from the theoretical simulation program are predicted parameters. The numerical simulation program may take into account aberrations, manufacturing tolerances, environmental conditions, and other real-world factors that may affect the performance of relay device 106, coupling device 120, and/or laser system 100 in general. The numerical simulation program may modify the determined parameters from the theoretical simulation program based on the real-world factors (step 196), to ensure that laser system 100 performs, in reality, as close as possible to how it was predicted to perform in the theoretical simulation program. Afterwards, one or more of the modified parameters from the numerical simulation program may be implemented in laser system 100 to reshape output laser beam 128 so it has a substantially circular cross-section (where, e.g., dimensions of the cross-section along transverse axes are substantially equal, such that a ratio of the dimensions is about 1:1), rather than a substantially elliptical cross-section (step 198) (where, e.g., dimensions of the cross-section along transverse axes are unequal).

If, on the other hand, the beam waist sizes in the x- and y-directions are indicative of a non-circular (e.g., elliptical) cross-sectional shape (NO 200), one or more of the values in table 146 may be adjusted until the beam waist sizes indicate a circular cross-sectional shape (step 202). The adjustment may be an iterative process that makes incremental adjustments to bring the beam waist sizes closer in value. Once the beam waist sizes indicate circularity, the method may proceed by running the adjusted values or parameters in the numerical simulation (step 204).

A more specific example of an application of method 140 will now be provided. The user of the theoretical simulation program, inherent in the operation of table 146, may review laser system 100 and input known parameters of laser system 100 into the appropriate cells of table 146. Table 146 may determine values for the other cells of table 146 using equations, such as equations 138. Table 146 may output beam waist sizes in thirteenth column 184 of second and fourth rows 152 and 156. The user may compare the beam waist sizes, and if they are not sufficiently close in value, the user may adjust values/parameters in table 146 to bring the beam waist sizes towards each other. The user may select which values/parameters to adjust based on, for example, a predetermined rule or rule set. In one example, a predetermined rule may be that the positional layout of components of laser system 100 should be maintained. Thus, the relative positions of laser resonator 102, relay device 106, galvo mirror 114, and coupling device 120, may have to be maintained. Under such restrictions, the user may make adjustments to the focal length of one or more of relay device 106 and coupling device 120, which may be dictated, at least in part, by curvature characteristics of their surfaces. The user may adjust the focal length value(s) iteratively, and/or in increments, to see the effect the adjustments have on the beam waist size(s). By recognizing trends, the user may adjust the focal length value(s) until the beam waist sizes are sufficiently close to indicate a circular cross-sectional shape. Alternatively, the theoretical simulation program and/or table 146 may be programmed to automatically make the iterative and/or incremental adjustments until the beam waist sizes are sufficiently close. The focal length value(s) may then be processed by the numerical simulation, and the modified focal length value(s) from the numerical simulation may be implemented in laser system 100 by, for example, modifying or replacing one or more of relay device 106 and coupling device 120. The above-outlined process is exemplary. It should be understood that other processes may be performed instead if, for example, a different predetermined rule or rule set is being followed by the user. In general, any of the values in table 146, or combinations thereof, may be adjusted to produce a desired effect on the beam waist sizes.

Figure 4A:
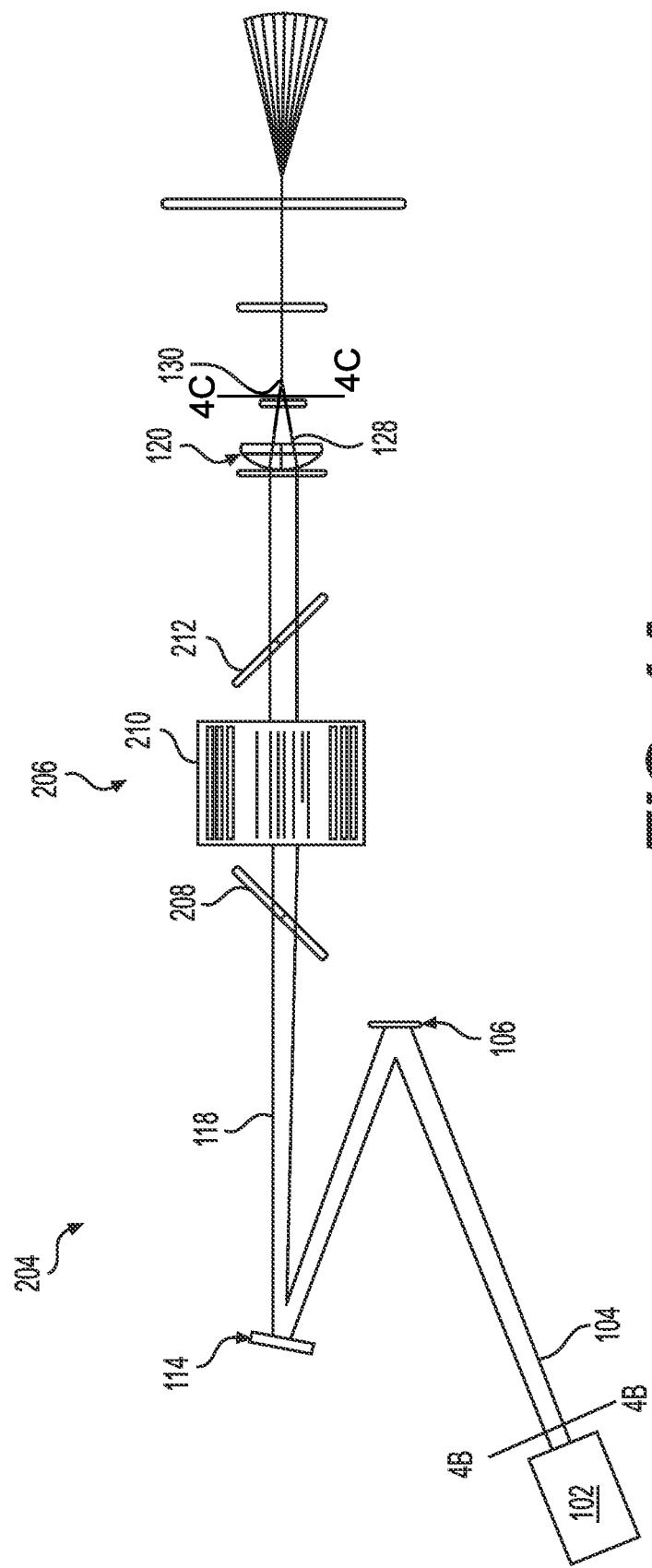
FIG. 4A is a schematic illustration of a portion of the laser system of FIG. 1A, with parameters having been set based on the table of FIG. 3A, in accordance with aspects of the present disclosure.
Figure 4C:
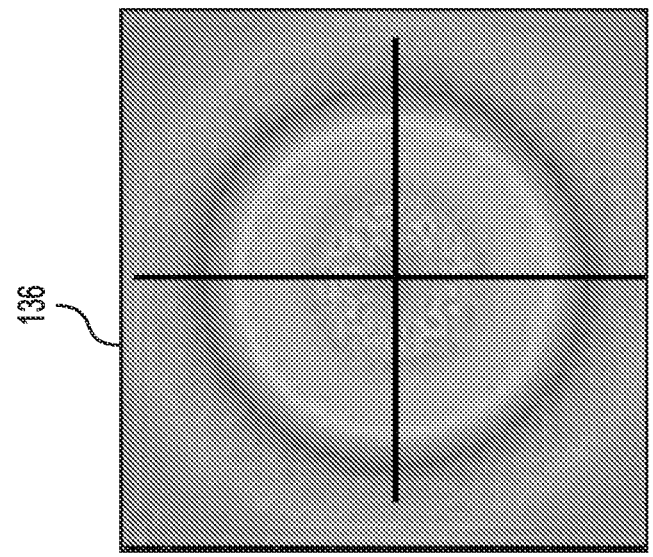
FIG. 4C is a view of a cross-section of a laser beam taken at another point within the portion of the laser system of FIG. 4A, in accordance with aspects of the present disclosure.
Figure 4B:
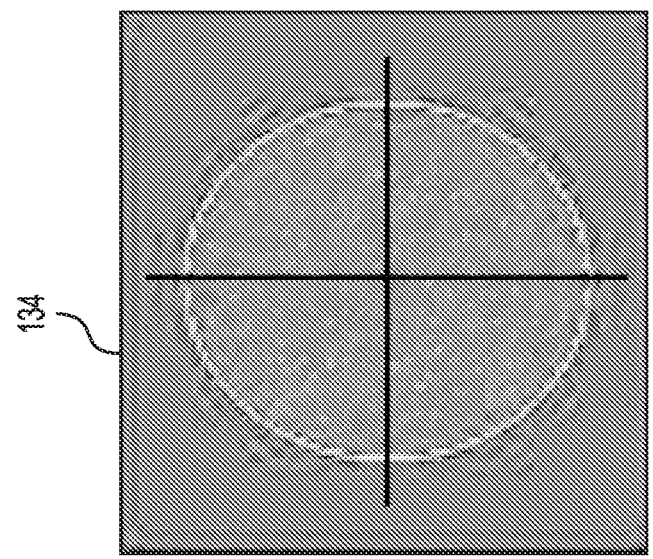
FIG. 4B is a view of a cross-section of a laser beam taken at a point within the portion of the laser system of FIG. 4A, in accordance with aspects of the present disclosure.

FIG. 4A shows aspects of a portion 204 of a laser system, including laser resonator 102, relay device 106, galvo mirror 114, and coupling device 120, after one or more of these components have been modified according to outputs obtained from method 140. FIG. 4B shows cross-section 134 of input beam 104 having an elliptical shape. FIG. 4C shows cross-section 136 of output laser beam 128 having a circular shape as a result of upstream reshaping. The alignment tolerance-improving effect of implementing method 140 is particularly evident when comparing the cross-sectional shape of output laser beam 128 from FIG. 1C to that shown in FIG. 4C. It should be understood that other portions of laser system 100, such as portions corresponding to the other three laser resonators and relay devices in FIG. 1A, also may be modified as a result of method 140. In one specific example, portion of laser system 100 may have the following parameters: d1=126 mm, d2=86 mm, d3=248 mm, f1=140 mm, and f2=19 mm. Also, the curved reflective surface of relay device 106 may have a curvature of −280 mm, and the curved surface of coupling device 120 may have a curvature of 14 mm.

FIG. 4A also shows an optics assembly 206. Optics assembly 206 may include an upstream beam splitter 208, a shutter 210, and a downstream beam splitter 212. Upstream beam splitter 208 may redirect a portion of second redirected laser beam 118 to a device (not shown) that may be used to determine a power of second redirected laser beam 118, based on the sample redirected by upstream beam splitter 208. Shutter 210 may provide a means for quickly cutting off second redirected laser beam 118, in case, for example, an emergency situation arises in which the emission of laser energy from optic fiber 130 should be avoided. Downstream beam splitter 212 may receive colored light from a source (not shown), such as an aiming laser that is visible to the user, which may be combined with second redirected laser beam 118, which may otherwise be invisible to the user, to facilitate aiming aim of the laser beam emitted from optic fiber 130 at a target area. None of the components of optics assembly 206 play a role in reshaping second redirected laser beam 118. For example, optics assembly 206 does not have a cylindrical lens. It is contemplated that optics assembly 206 may be incorporated into laser system 100 of FIG. 1A.

Figure 5A:
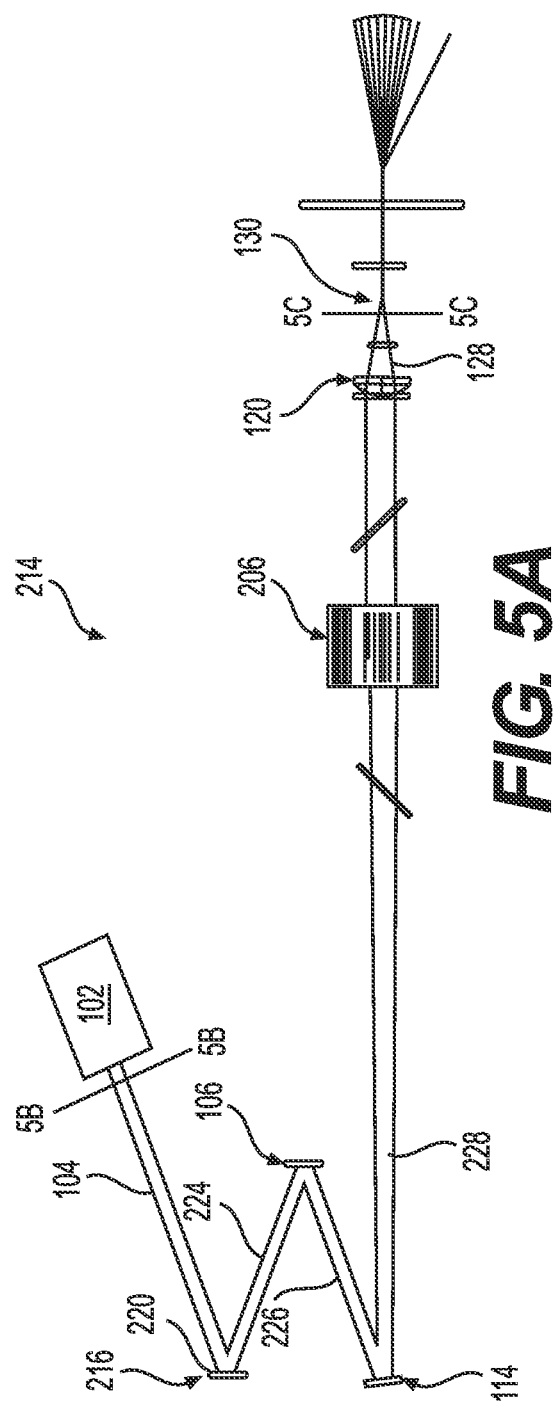
FIG. 5A is a schematic illustration of a portion of a laser system, in accordance with aspects of the present disclosure.
Figure 5C:
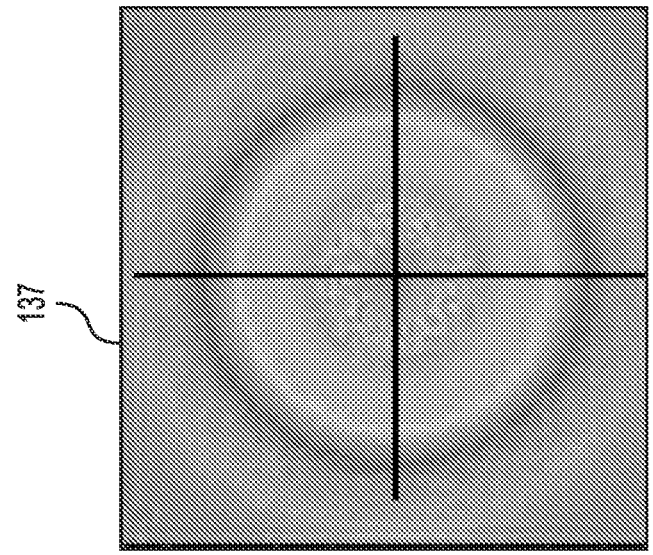
FIG. 5C is a view of a cross-section of a laser beam taken at another point within the portion of the laser system of FIG. 5A, in accordance with aspects of the present disclosure.
Figure 5B:
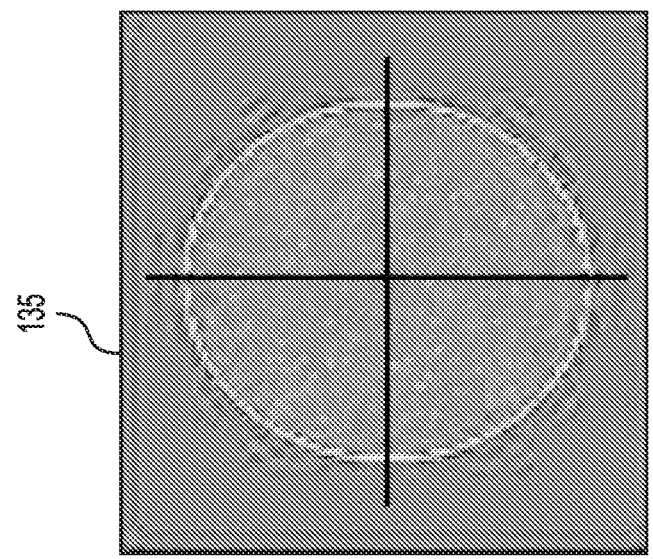
FIG. 5B is a view of a cross-section of a laser beam taken at a point within the portion of the laser system of FIG. 5A, in accordance with aspects of the present disclosure.

FIG. 5A shows another portion 214 of a laser system. The portion 214 may be used in place of any of the portions of laser system 100 from the previous figures (see, e.g., FIG. 4A). The portion 214 may include all of the same components as the portion 204 of laser system 100. In addition, the portion 214 may include an additional relay device 216. Relay device 216 may be similar to relay device 106. Relay devices 106 and 216 may provide the four degrees of freedom used to aim input beam 104 at galvo mirror 114. Accordingly, laser resonator 102 may be fixed, instead of movable. By making laser resonator 102 fixed, potential problems with respect to performance, cost, and reliability, tied to making laser resonator 102 movable, may be avoided. In portion 214, input beam 104 may be reflected off of relay device 216 to produce a first redirected laser beam 224, first redirected laser beam 224 may be reflected off of relay device 106 to produce a second redirected laser beam 226, second redirected laser beam 226 may be reflected off of galvo mirror 114 to produce third redirected laser beam 228, and third redirected laser beam 228 may be directed through coupling device 120 to produce output laser beam 128. The cross-sectional shape of input laser beam 104 may be elliptical, while the cross-sectional shape of output laser beam 128 may be circular. FIG. 5B shows a cross-section 134 of input beam 104 (taken along the line 5B-5B in FIG. 5A) having an elliptical shape. FIG. 5C shows a cross-section 136 of output laser beam 128 (taken along the line 5C-5C in FIG. 5A) having a circular shape as a result of upstream reshaping.

FIG. 6 shows a table 218 similar to table 146, but with values associated with portion 214. For example, table 218 may include rows for relay device 216 and coupling device 120. Using table 218, and the steps of method 140, values and parameters of relay device 216 and/or coupling device 120 may be modified to reshape output laser beam 128 so it has a circular cross-sectional shape. In one specific embodiment of portion 214, portion 214 may have the following values and parameters: f1=175 mm, f2=29.7 mm, d1=133.3 mm (d1 being the distance between laser resonator 102 and relay device 106), d2=84 mm (d2 being the distance between relay devices 216 and 106), d3=87 mm (d3 being the distance between relay device 106 and galvo mirror 108, and d4=450 mm (d4 being the distance between galvo mirror 108 and coupling device 120. Also a reflective surface 220 of relay device 106 may have a curvature of −350 mm, and curved surface 124 of coupling device 120 may have a curvature of 21.825 mm.

FIG. 7 shows a table 222, which also has values associated with portion 214, and may be similar to tables 146 and 218. FIG. 7 may include rows for relay device 106 and coupling device 120. Using table 222, and the steps of method 140, values and parameters of relay device 106 and/or coupling device 120 may be modified to reshape output laser beam 128 so it has a circular cross-sectional shape. In one specific embodiment of portion 214, portion 214 may have the following values and parameters: f1=185 mm, f2=21.78 mm, d1=133.3 mm, d2=84 mm, d3=87 mm, and d4=450 mm Also the reflective surface 110 of relay device 106 may have a curvature of −350 mm, and a curved surface 124 of coupling device 120 may have a curvature of 16 mm.

Tables 218 and 222 may be used separately. Alternatively, tables 218 and 222 may be used in combination. For example, the beam waist size values in the first and third rows of the thirteenth and fourteenth columns of table 146, may be entered in the first and third rows of the first and second columns of table 146, due to additional relay device 216 being upstream from relay device 106. It should also be understood that tables 218 and 222, may be combined into a single table. When the values of the parameters in tables 218 and/or 222 have been optimized to result in laser beam circularity, those values may be modified by running them through the numerical simulator, and then may be implemented in the laser system.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims

I claim:

1. A laser system for a lithotripsy procedure, the system comprising:
   a plurality of laser resonators each configured to output a respective resonator output laser beam;
   an optical relay device, for each of the plurality of laser resonators, the optical relay devices disposed in an optical path of respective resonator output laser beams and configured to redirect the resonator output laser beams from the optical pathways to respective secondary optical pathways, wherein the secondary optical pathways are configured to converge at a point;
   a galvo mirror disposed at the point where the secondary optical pathways converge, the galvo mirror configured to combine the resonator output laser beams to form an output laser beam laser beam and direct the output laser beam along an output pathway, wherein the output laser beam has an elliptical cross-sectional shape;
   a coupling device disposed in the output pathway and configured to shape the output laser beam to have a circular cross-sectional area; and
   a fiber optic coupler disposed in the optical pathway downstream from the coupling device, the fiber optic coupler configured to couple to a fiber optic cable and to optically couple the shaped output laser beam to the fiber optic cable.

2. The laser system of claim 1, wherein the coupling device comprises a spherical lens.

3. The laser system of claim 2, wherein the galvo mirror has a first focal length, and the spherical lens has a second focal length, and wherein a distance between the galvo mirror and the coupling device is selected such that the shaped output laser beam has substantially equal radii in the x direction and the y direction.

4. The laser system of claim 1, wherein the optical relay devices have third focal lengths and wherein the distance between the plurality of laser resonators and the optical relay devices and the distance between the optical relay devices and the galvo mirror is selected such that the shaped output laser beam has substantially equal radii in the x direction and the y direction.

5. The laser system of claim 1, comprising the fiber optic cable.

6. The laser system of claim 5, wherein the fiber optic cable has a circular core.

7. The laser system of claim 1, wherein the circular cross-sectional area has dimensions of approximately 1:1 measured along the transverse axes.

8. The laser system of claim 1, wherein the galvo mirror has a planar reflective surface.

9. The laser system of claim 1, wherein the optical relay devices comprise mirrors.

10. An optical system for a lithotripsy laser console, the optical system comprising:
    a plurality of laser resonators each configured to output a respective resonator output laser beam;
    an optical relay device, for each of the plurality of laser resonators, the optical relay devices disposed in an optical path of respective resonator output laser beams and configured to redirect the resonator output laser beams from the optical pathways to respective secondary optical pathways, wherein the secondary optical pathways are configured to converge at a point;

a galvo mirror disposed at the point where the secondary optical pathways converge, the galvo mirror configured to combine the resonator output laser beams to form an output laser beam laser beam and direct the output laser beam along an output pathway, wherein the output laser beam has an elliptical cross-sectional shape; and a coupling device disposed in the output pathway and configured to shape the output laser beam to have a circular cross-sectional area.

11. The optical system of claim 10, wherein the coupling device comprises a spherical lens, wherein the galvo mirror has a first focal length, and the spherical lens has a second focal length, and wherein a distance between the galvo mirror and the coupling device is selected such that the shaped output laser beam has substantially equal radii in the x direction and the y direction.

12. The optical system of claim 10, wherein the optical relay devices have third focal lengths and wherein the distance between the plurality of laser resonators and the optical relay devices and the distance between the optical relay devices and the galvo mirror is selected such that the shaped output laser beam has substantially equal radii in the x direction and the y direction.

13. The optical system of claim 10, wherein the circular cross-sectional area has dimensions of approximately 1:1 measured along the transverse axes.

14. The optical system of claim 10, wherein the galvo mirror has a planar reflective surface.

15. The optical system of claim 10, wherein the optical relay devices comprise mirrors.

16. A method of calibrating a medical optical system for outputting a laser beam having a circular cross-sectional area, comprising:

identifying a first focal length of a galvo mirror, the galvo mirror disposed at a point where optical pathways associated with laser beams output by a plurality of laser resonators converge, wherein the galvo mirror is configured to combine the resonator output laser beams to form an output laser beam laser beam and direct the output laser beam along an output pathway, and wherein the laser beams have an elliptical cross-sectional shape;

identifying a second focal length of a spherical lens of a coupling device, the coupling device disposed in the output pathway and configured to shape the output laser beam to have a circular cross-sectional area;

identifying a first distance between the galvo mirror and the coupling device based in part on the first focal length and the second focal length such that the shaped output laser beam has substantially equal radii in the x direction and the y direction; and adjusting the position of the galvo mirror relative to the coupling device and/or the position of the coupling device relative to the galvo mirror such that the distance between the galvo mirror and the coupling device is substantially equal to the first distance.

17. The method of claim 16, further comprising:

identifying a third focal length of an optical relay device, wherein the medical optical system comprises an optical relay device for each of the plurality of laser resonators, the optical relay devices disposed in an optical path of respective resonator output laser beams and configured to redirect the resonator output laser beams from the optical pathways to the point;

identifying a second distance between the optical relay devices and the galvo mirror based in part on the first focal length, second focal length, third focal length, and first distance; and adjusting the position of the optical relay devices relative to the galvo mirror such that the distance between the optical relay devices and the galvo mirror is substantially equal to the second distance.

18. The method of claim 17, further comprising:

identifying a third distance between the plurality of laser resonators and the optical relay devices based in part on the first focal length, second focal length, third focal length, first distance and second distance; and adjusting the position of the plurality of laser resonators relative to the optical relay devices such that the distance between the plurality of laser resonators and the optical relay devices is substantially equal to the third distance.

19. The method of claim 18, wherein the galvo mirror has a planar reflective surface.

20. The method of claim 18, wherein the optical relay devices comprise mirrors.

* * * * *